W. F. KENNEY.
NUT LOCK.
APPLICATION FILED NOV. 22, 1909.

995,468.

Patented June 20, 1911.

WITNESSES
Chas E Smith
Alvine Bernier

INVENTOR
William F. Kenney
per J. Schofield
ATTORNEY

UNITED STATES PATENT OFFICE.

WILLIAM F. KENNEY, OF PROVIDENCE, RHODE ISLAND.

NUT-LOCK.

995,468.  Specification of Letters Patent.  Patented June 20, 1911.

Application filed November 22, 1909. Serial No. 529,474.

*To all whom it may concern:*

Be it known that I, WILLIAM F. KENNEY, a citizen of the United States, residing at Providence, in the State of Rhode Island, have invented a new and useful Improvement in Nut-Locks, of which the following is a specification.

In a certain class of nut-locks in which right and left hand screw threads are employed upon the exterior of the bolt, in combination with reversely threaded holding and locking nuts, it is found that in order to prevent the occurrence of backlash in the use of the nut-lock, it is essential that an internal shoulder should be interposed as a bearing seat, between the said holding and locking nuts, instead of using the outer side of the holding nut, for a bearing seat, as heretofore; and my invention consists in the employment of an interior bearing shoulder between the holding and locking nuts, whereby backlash in the nut-lock will be prevented.

Figure 1:
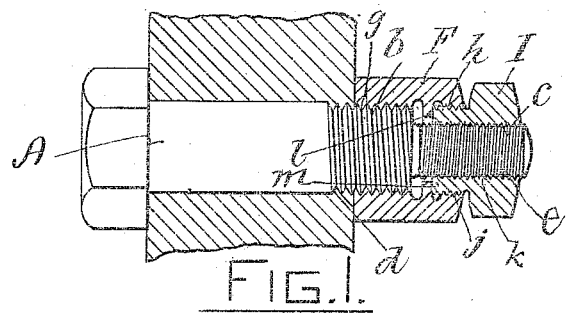
Figure 2:
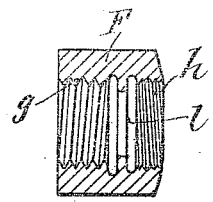
Figure 3:
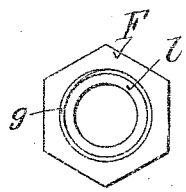
Figure 4:
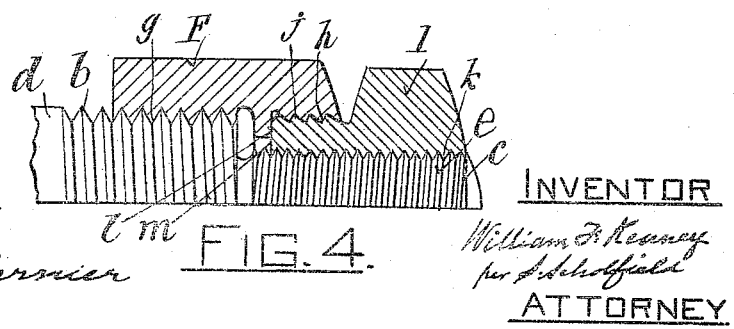

In the accompanying drawing: Figure 1 represents a side view of the bolt and an axial section of the locking nut and the holding nut. Fig. 2 represents an axial section of the holding nut. Fig. 3 represents an outer end view of the holding nut. Fig. 4 is a diagram representing the resulting form of the locking threads, when they are not coincident with each other, and the holding nut is screwed up to its seat.

In the drawing A represents a screw bolt provided with the screw thread $b$, and the extension $c$, of smaller diameter than the body $d$ of the bolt, the said extension being provided with a screw thread $e$ of reverse inclination to that of the screw thread $b$, the screw thread $b$ being shown as a right hand thread, and the screw thread $e$ as a left hand thread in the drawing.

The holding nut F is provided with a screw thread $g$, fitting the thread $b$ of the bolt, and also with a reverse screw thread $h$ of a pitch which corresponds to that of the thread $e$ upon the extension $c$; and a locking nut I is provided with a tenon $m$ having upon its exterior a screw thread $j$, fitting the screw thread $h$ and an internal screw thread $k$ fitting the thread $e$ of the said extension. The nut F is also provided with a shoulder $l$, and the distinctive feature of my invention consists in arranging the shoulder $l$ in such a position relatively to the locking nut I that the end of the tenon $m$ of the locking nut may in all cases be brought up against the said shoulder, and by this means any liability of backlash movement of the holding nut will be prevented.

In effecting the proper adjustment of my improved nut lock, the holding nut F is first to be screwed up to its proper tight bearing, and then turned slightly back in order that the locking nut I may be in all cases screwed up tightly to its seat at the shoulder $l$ of the holding nut, and then when the holding nut is screwed up to its seat, the said holding nut will be firmly locked upon the bolt, the screw threads $h$ and $j$ becoming transformed in the inclination of their sides as shown in Fig. 4, owing to the cramping of the threads, whenever the holding nut has been turned to a position in which the thread $j$ of the holding nut does not coincide in position with the thread $e$ of the extension $c$; and in some cases on account of this distortion of the thread, the locking nut I should be again tightened up to its limiting shoulder.

I claim as my invention:

1. In a nut-lock, the combination of a bolt having upon its exterior both right and left hand screw threads, with a holding nut and a locking nut fitting the said screw threads of the bolt, respectively, one of the nuts being provided with an externally screw-threaded tenon, and the other with an internal screw-thread, and also with an internal bearing shoulder adapted for engagement with the said tenon, the said engaging parts of the nuts being screwed up to contact with each other when the nut-lock is in use, whereby backlash in the action of the nut-lock will be prevented.

2. In a nut-lock, the combination of a bolt having upon its exterior both right and left hand screw threads, with a holding nut and a locking nut, fitting the said screw threads of the bolt, respectively, one of the nuts being provided with an externally screw-threaded tenon, and the other with an internal screw-thread adapted for engagement with the said external thread of the tenon; and also provided with an internal bearing shoulder adapted for engagement with the said tenon, whereby the said nuts may be screwed together upon the bolt with resulting distortion of the parts in engagement, and backlash in the action of the nut-lock be prevented.

WILLIAM F. KENNEY.

Witnesses:
SOCRATES SCHOLFIELD,
CHAS. E. SMITH.